2,945,228
Patented July 12, 1960

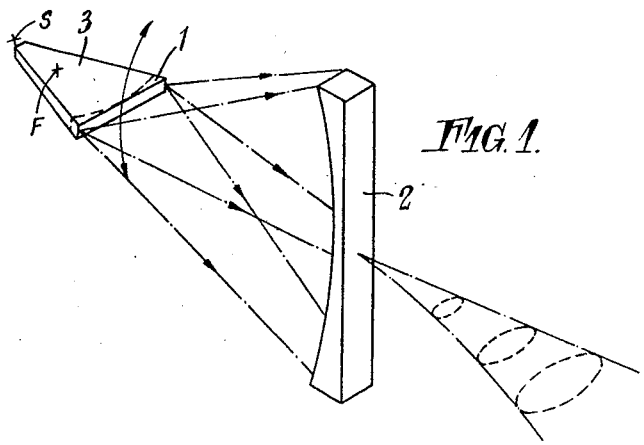
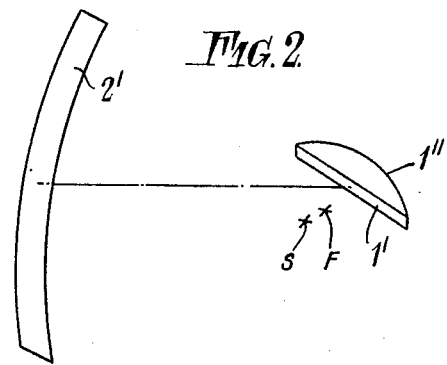
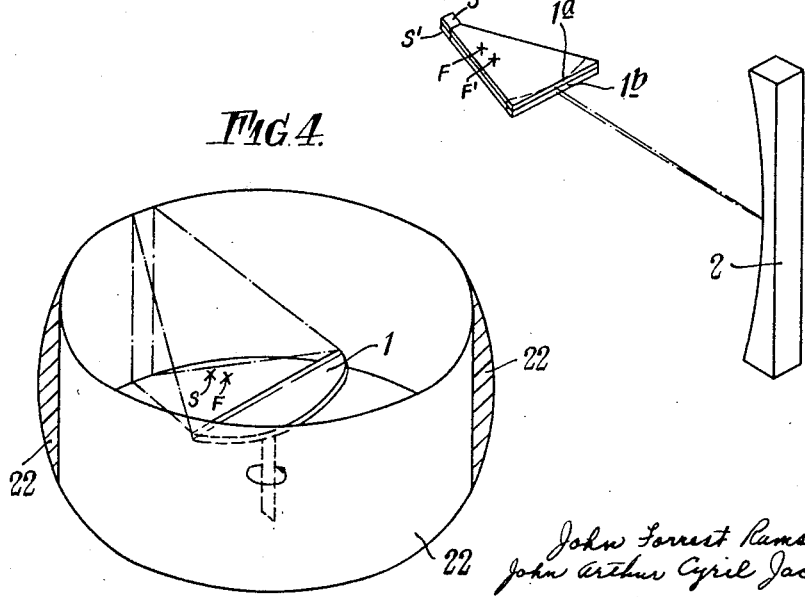

2,945,228
ANTENNA HAVING TWO FOCUSING ELEMENTS

John Forrest Ramsay and John Arthur Cyril Jackson, Great Baddow, England, assignors to Marconi's Wireless Telegraph Company Limited, London, England, a British company Filed Aug. 16, 1954, Ser. No. 450,012

Claims priority, application Great Britain Aug. 21, 1953

6 Claims. (Cl. 343—753)

This invention relates to aerial systems.

The principal object of the invention is to provide an aerial system which produces a beam which is sharp in elevation and broad in azimuth and yet is compact in construction and of considerably less weight, windage area, and cost, than antenna structures heretofore known.

According to this invention an aerial system comprises two aerial elements of which one has an aperture with one dimension much longer than the dimension at right angles thereto and the other is focussed upon said one aerial with a dimension of its aperture focussed to substantial coincidence with the smaller dimension of the aperture of said one aerial element.

In the present specification the term aerial element is used in a wide sense to include elements both of the lens and mirror type.

The invention is illustrated in the accompanying drawings which show a number of embodiments schematically and in which:

Fig. 1 shows one embodiment of an aerial system according to the invention;

Fig. 2 shows a modification of the system of Fig. 1;

Fig. 3 shows a further modification of the system of Fig. 1; and

Fig. 4 shows a further embodiment of an aerial system according to the invention.

Referring to Fig. 1 the aerial system therein shown comprises two radio lenses 1, 2 of which the first one is at the focus of the second. Each lens has an elongated aperture, the direction of elongation of the lens 1 being substantially at right angles to that of the second lens 2. For use for height finding purposes in a radar system the long dimension of the aperture of lens 1 would be horizontal and that of lens 2 vertical but the invention is, of course, not limited to this particular arrangement and the lenses might be mounted at other angles so long as the relative angle between the long aperture dimensions is substantially a right angle. The aperture dimension at right angles to the long dimension is, in each lens, small in relation to the said long dimension. The lens 1 may be as shown a shielded lens at the end of a flat horn 3—the outline of the lens is indicated in broken lines—or may be between metal plates. The focus F of lens 1 is located intermediate the flat horn 3 and a source S is positioned beyond the focus F with respect to the lens 1. Thus, in accordance with well known optical principles, the wave energy passing through lens 1 will be converged onto the narrow dimension of element 2.

In operation of the aerial system of Fig. 1 the lens 1 produces an initial beam which is broad in elevation (assuming the lens is horizontal) and which is sharply focussed in azimuth. The vertical limits of the beam are such that it just spans the narrow dimension of the lens 2. This beam is focussed by the lens 2 into a final beam which is sharp in elevation and broad in azimuth, such as can be advantageously employed for height finding purposes in a radar system.

An important practical advantage of this aerial system is that metal plates or the like to enclose the space between the two lenses are unnecessary and this means that such a system is of considerably less weight, windage and cost than a "cheese" or the like of comparable performance.

By way of numerical example, in the aerial system of Fig. 1 the lens 2 may have a vertical aperture of 85λ, (λ being the wave-length of the radiated energy) and a horizontal aperture of 8.5λ, the focal length being 85λ. The lens 1 may have an aperture of 1.6λ vertically by 18.5λ horizontally, the focal length being 18.5λ. The overall focal length of the system is therefore 103.5λ. The lens 1 so dimensioned will produce a beam which is 53° wide in elevation and 6° wide in azimuth and the final beam will be substantially 1° wide in elevation and 10° wide in azimuth.

The lenses, which are only schematically indicated, may be of the metal plate, metal egg-box, dielectric or any other type known per se.

The aerial system constructed and installed as described with reference to Fig. 1 can be arranged to give wide angle vertical scanning by reciprocating the lens 1 up and down as indicated by the double headed arrow, so that the lens 1 is always aimed at the center of the lens 2. Alternatively a plurality of stationary elongated lenses like the lens 1 may be stacked on one another in the direction of the shorter aperture dimension, and switched in in succession or each connected to its own receiver or transmitter.

The arrangement of Fig. 1 like other arrangements in accordance with this invention may be used for transmission or reception or both. It may also be used, for example, as a navigation beacon, to receive and retransmit or reflect incident waves if desired after modulating the same in known manner.

Either or both the lenses may be replaced by an equivalent mirror. Fig. 2 shows an arrangement in which both lenses are replaced by mirrors. In Fig. 2 the second lens 2 of Fig. 1 is replaced by a cylindro-parabolic mirror 2' and the lens 1 of Fig. 1 by a cheese-type unit 1' which is offset to be out of the path of the reflected beam and whose reflector surface 1'' is of elliptical curvature. In place of the "cheese" other suitable forms of radiator could be used, e.g. a so-called "pill-box" or a so-called "hoghorn." As is well known the "pill-box" differs from the "cheese" only in that it is adapted for vertical instead of horizontal polarization while the "hoghorn" is a cheese like structure with a radio horn facing into the center of its mouth. Here, again, the horn which constitutes the source S is located more remote from the element 1' than the focus F of element 1' to converge the beam on the narrow dimension of element 2'.

In radar installations it is often required to determine the height of a target with great precision and the so-called "beam split" technique (described by Frey and Goward in their monograph "Centimetric aerials," Cambridge University Press) is now well known for this purpose. The present invention may be adapted to the use of this technique by duplicating the first lens (or mirror) 1. Fig. 3 shows the arrangement of Fig. 1 adapted for "beam-split" technique, there being two lenses $1^a$, $1^b$, closely superimposed on one another each having its own enclosing plates. The lenses $1a$ and $1b$ have foci F and F', respectively, and these lenses are fed from sources S and S', respectively, each more remote from the lens than the focus.

Fig. 4 shows a further modification having the important practical advantage, where azimuth scanning is required, that such scanning can be obtained by merely rotating the smaller member of the aerial system in place of the whole system. Fig. 4 may be regarded as an extension of Fig. 1, the extension consisting of replacing the strip like lens 2 of Fig. 1 by a ring like lens constituted by the body of revolution of a section of the lens 2 about a center constituted by the center of rotation of a lens 1. In Fig. 4 the radiator 1, which is rotatable about the axis of the ring lens 22, is focussed thereon. With this arrangement full 360° scanning in azimuth can be obtained by rotating only the radiator 1, the ring like radiator 22 being fixed. In this embodiment, as in the previously described embodiments, the source S is located more remote from element 1 than the focus F of element 1 to cause the beam to converge on element 22.

In constructions of the nature of Fig. 4, i.e. constructions wherein a rotating radiator is at the axis of a ring like radiator, the advantage of obtaining full scanning in azimuth by rotating only a small part of the aerial system can be obtained by focussing the rotating radiator to infinity instead of upon the ring like radiator.

While we have described our invention in certain preferred embodiments, we realize that modifications may be made, and we desire that it be understood that no limitations upon our invention are intended other than may be imposed by the scope of the appended claims.

We claim:

1. An aerial system comprising two focussing aerial elements each having an aperture with one dimension much longer than the dimension perpendicular thereto, the longer dimension of the aperture of one element being substantially perpendicular to the longer dimension of the aperture of the other, one of said elements being positioned at the focus of the other and the said one element being arranged to focus on said other element, and source means positioned more remote from said one element than the focus of said one element.

2. A system as set forth in claim 1 wherein at least one of the elements is a lens.

3. A system as set forth in claim 1, wherein at least one of the elements is a mirror.

4. A system as set forth in claim 1, wherein both elements are mirrors and the one element is offset to be out of the reflected beam from the other.

5. A system as set forth in claim 1, wherein said one element has an aperture of elongated, rectangular form and the other element is an element of elongated rectangular form.

6. An aerial system comprising a rotatable focussing aerial element having an aperture of elongated rectangular form, the axis of rotation being substantially perpendicular to the longer dimension thereof, a plurality of fixed focussing aerial elements arranged on the locus of the point on which said rotatable element focussed as it rotates, each of said plurality of elements being substantially parallel to and having its focus substantially at the axis of rotation of said first mentioned aerial element, and source means positioned a greater distance from said rotatable element than the focal length thereof.

References Cited in the file of this patent
UNITED STATES PATENTS

| | | |
|---|---|---|
| 2,527,222 | Iams | Oct. 24, 1950 |
| 2,562,277 | Kock | July 31, 1951 |
| 2,596,190 | Wiley | May 13, 1952 |
| 2,597,391 | Sichak | May 20, 1952 |
| 2,611,870 | Clavier | Sept. 23, 1952 |